United States Patent
Meyer et al.

[15] 3,684,873
[45] Aug. 15, 1972

[54] METHOD AND APPARATUS FOR ADAPTIVE PROGRAMMED CONTROL OF A TURNING MACHINE TOOL

[72] Inventors: Jurgen Meyer, Adalbert-Stifter 5; Gerhard Sautter, Mozorstr 28 1/2, both of 8520 Erlanger, Germany

[22] Filed: Sept. 23, 1970

[21] Appl. No.: 74,618

[30] Foreign Application Priority Data

Oct. 1, 1969   Germany..........P 18 03 742.8

[52] U.S. Cl. ...............235/151.11, 318/39, 318/561, 318/571
[51] Int. Cl. ........................B23q 5/28, G05b 19/18
[58] Field of Search ...235/151.11; 318/571, 39, 561, 318/570

[56] References Cited

UNITED STATES PATENTS 3,273,182   9/1966   McDonald.............318/571 X
3,389,313   6/1968   Reynolds....................318/39
3,418,549   12/1968   Emerson et al..........318/39 X

*Primary Examiner*—Joseph F. Ruggiero
*Attorney*—Curt M. Avery, Arthur E. Wilfond, Herbert L. Lerner and Daniel J. Tick

[57] ABSTRACT

The deviation $Xu$ of the actual contour of a workpiece from the finished programmed contour is derived during each of the processing cycles at the end of each programmed processing section. The programmed contour of the workpiece in the next-succeeding programmed processing section is compared with the derived deviation $Xu$ to provide a comparison result during each of the processing cycles at the end of each programmed processing section. The next-succeeding programmed processing section is eliminated or utilized in accordance with the comparison results.

4 Claims, 12 Drawing Figures

METHOD AND APPARATUS FOR ADAPTIVE PROGRAMMED CONTROL OF A TURNING MACHINE TOOL

DESCRIPTION OF THE INVENTION

The invention relates to a method and apparatus for the adaptive programmed control of a turning machine tool for removal of material from a workpiece. More particularly, the invention relates to a method and apparatus for the adaptive programmed control of a turning machine tool such as, for example, a lathe, milling machine, boring machine, or the like, for the removal of material from a workpiece by programmed processing sections during processing cycles.

The method and apparatus of the invention for the adaptive programmed control of a turning machine tool for removal of material from a workpiece are an improvement over the method and apparatus disclosed in copending patent application Ser. No. 866,507, filed Oct. 15, 1969 and now abandoned, for "Method and Apparatus for Automatic Forward Feed Programmed Control of a Machine Tool," and assigned to the same assignee. In the aforedescribed copending patent application, the tool is rapidly fed until it comes into contact with a workpiece. The tool is work fed up to a maximum to the programmed contour after a magnitude depending upon the forming power and the material removing rate exceeds a lower threshold level. The work feeding and movement of the tool are reduced in the direction of reduced feed-in for a period of time until the magnitude depending upon the forming power exceeds an upper threshold level. The processing operation is repeated until the actual contour of the workpiece coincides with a programmed contour. The programmed contour may be recorded or stored on any suitable record medium such as, for example, a perforated strip or tape.

In the method and apparatus of the aforedescribed copending patent application, the torque of the tool or workpiece, or of the spindle driving the tool or workpiece, is utilized as a controlled variable for removing material or metal from the workpiece or for the forming power of the tool. It is often more preferable to utilize for this purpose the product of the torque and the speed of the spindle which drives the tool or workpiece, as disclosed in copending U.S. Pat. application Ser. No. 74,637, filed Sept. 23, 1970. In this type of adaptive control system, the same program is repeatedly fed into the control apparatus until the actual contour of the workpiece coincides with the contour programmed on the record medium.

The magnitude depending upon the forming power may be a torque which is absorbed by the machine tool, workpiece, or the like, or it may be the force which is exerted upon the machine too.

In this type of adaptive control system, the cutting depth, feed, and so on, are automatically determined by the machine magnitude. On occasion, during one or a plurality of processing cycles, various sections of the program are not utilized. This may occur, for example, if the sections of the program are not expected to be reached within the next cut, or if they have been partly anticipated by the control system.

The principal object of the invention is to provide a new and improved method and apparatus for adaptive programmed control of a turning machine tool.

An object of the invention is to provide a method for the adaptive programmed control of a turning machine tool with efficiency, effectiveness and reliability.

An object of the invention is to provide apparatus for the adaptive programmed control of a turning machine tool with efficiency, effectiveness and reliability.

An object of the invention is to provide a method and apparatus for processing a workpiece by turning machine tool in a minimum time.

In accordance with the invention, a method for adaptive programmed control of a turning machine tool for removal of material from a workpiece by programmed processing sections during processing cycles includes the steps of rapidly feeding the tool until it comes into contact with a workpiece, work feeding the tool up to a maximum to the programmed contour after a magnitude depending upon the forming power and the material removing rate exceeds a lower threshold level, reducing the work feeding and movement of the tool in the direction of reduced feed-in for a period of time until the magnitude depending upon the forming power exceeds an upper threshold level, and work feeding the tool repeatedly until the actual contour of the workpiece coincides with a programmed contour. In accordance with the invention, the method comprises the steps of deriving the deviation $Xu$ of the actual contour of the workpiece from the finished programmed contour during each of the processing cycles at the end of each programmed processing section, comparing the programmed contour of the workpiece in the next-succeeding programmed processing section with the derived deviation $Xu$ to provide a comparison result during each of the processing cycles at the end of each programmed processing section, and eliminating or utilizing the next-succeeding programmed processing section in accordance with the comparison result.

The programmed processing section includes a programmed change $Xe$ in the contour of the workpiece and the next-succeeding programmed processing section is eliminated when the derived deviation $Xu$ exceeds the programmed change $Xe$ of the contour in the next-succeeding programmed processing section. When the derived deviation $Xu$ is less than the programmed change $Xe$ of the contour in the next-succeeding processing section only the difference between the programmed change $Xe$ in the processing section and the derived deviation $Xu$ is utilized to control the machine tool. The method of the invention further comprises the step of altering the derived deviation $Xu$ for the processing section following the next-succeeding processing section when the derived deviation $Xu$ exceeds the programmed change $Xe$ of the contour in the next-succeeding programmed processing section.

All the programmed processing sections are fed in only during the first processing cycle and the section which starts the next cycle after the first is determined by the deviation of the programmed contour.

Apparatus for adaptive programmed control of a turning machine tool for removal of material from a workpiece by programmed processing sections during processing cycles includes feeding means for rapidly feeding the tool until it comes into contact with a workpiece, and work feeding means for work feeding the tool up to a maximum to the programmed contour after a magnitude depending upon the forming power and the material removing rate exceeds a lower threshold level and for reducing the work feeding and movement of the tool in the direction of reduced feed-in for a period of time until the magnitude depending upon the forming power exceeds an upper threshold level, said work feeding means operating repeatedly until the actual contour of the workpiece coincides with a programmed contour. The apparatus comprises deriving means for deriving the deviation $Xu$ of the actual contour of the workpiece from the finished programmed contour during each of the processing cycles at the end of each programmed processing section. Deviation memory means coupled to the deriving means stores the derived deviation $Xu$. Final value memory means stores the programmed change $Xe$ of the contour in the next-succeeding programmed processing section. Comparing means connected to the deviation memory means and the final value memory means compares the programmed contour change $Xe$ of the workpiece in the next-succeeding programmed processing section with the derived deviation $Xu$ stored in the memory means to provide a comparison result during each of the processing cycles at the end of each programmed processing section. Circuit means coupled between the comparing means and the memory means eliminates or utilizes the next-succeeding programmed processing section in accordance with the comparison result.

In order that the invention may be readily carried into effect, it will now be described with reference to the accompanying drawings, wherein.

Figure 6:
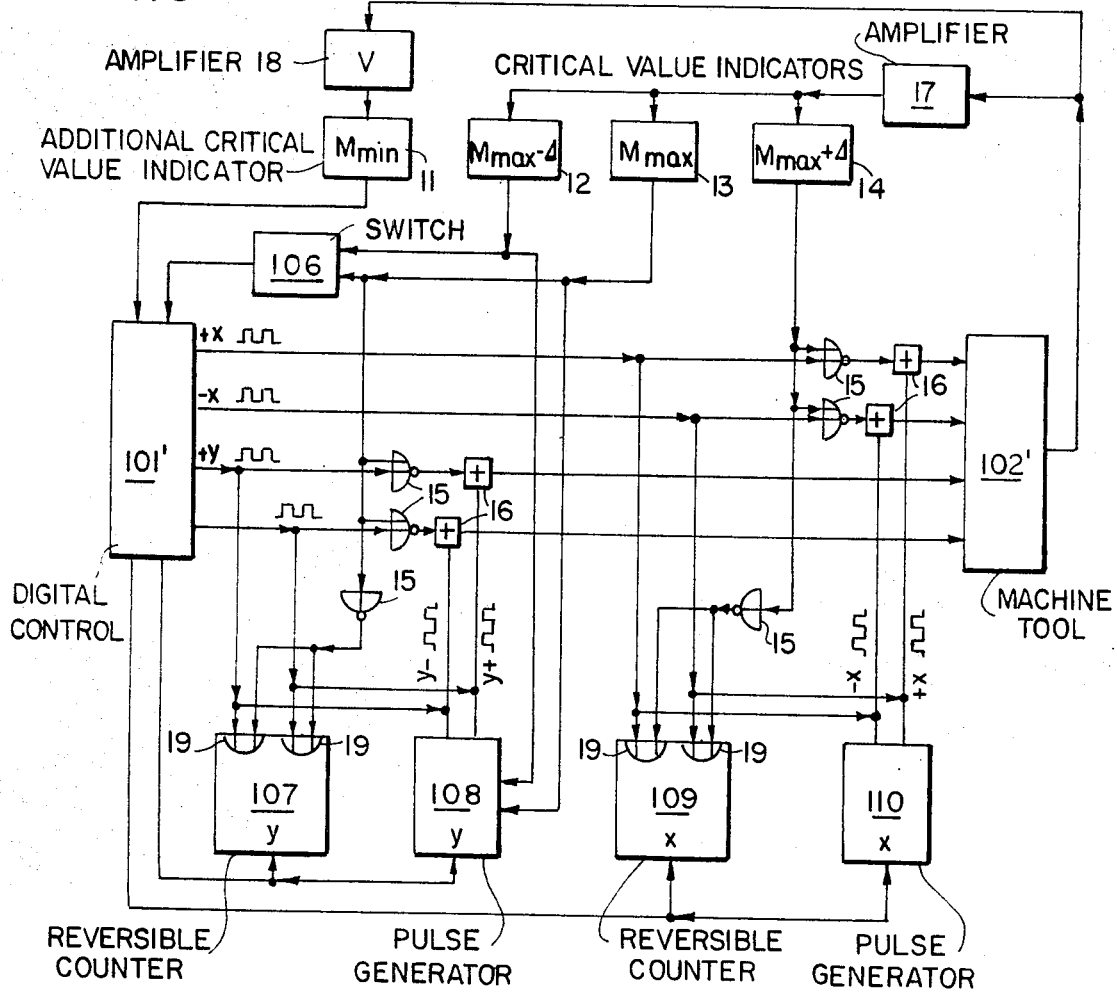

FIG. 6 is a schematic block diagram, in more detail, of the circuit arrangement of copending patent application Ser. No. 866,507 for providing variable workpiece contours in accordance with the method illustrated in FIGS. 8a and 8b; and FIGS. 7a, 7b, 8a and 8b illustrate various methods of the copending patent application Ser. No. 866,507 for providing variable workpiece contours.

In the FIGS., the same components are identified by the same reference numerals.

Figure 1A:
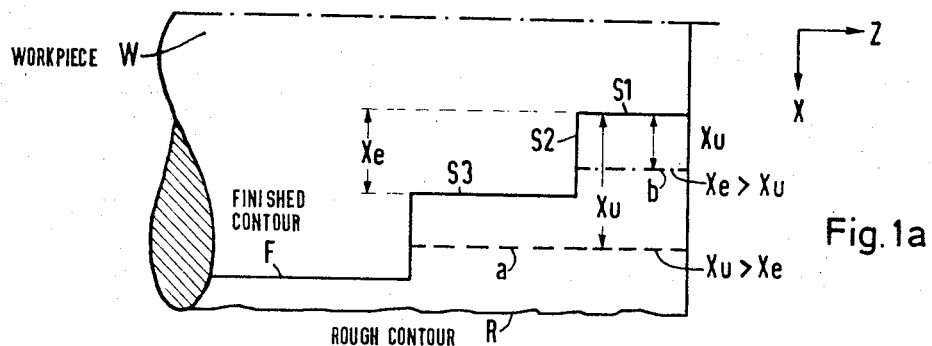
FIGS. 1a, 1b and 1c are schematic diagrams illustrating different cut distributions during adaptive processing of a workpiece by a turning machine in accordance with the method and apparatus of the invention.

FIG. 1a illustrates the fabrication of a section of a shaft or workpiece W. The workpiece W has a rough contour R and a finished contour F. In order to maintain clarity of illustration, only three sections S1, S2, S3 of the program are shown and described.

At the commencement or initiation of the processing operation, one of the first cuts is made, for a period of time, along a broken line $a$. In this case, there is a deviation $Xu$ between the actual contour $a$ of the workpiece W and the finished programmed contour F of said workpiece.

In this case, the deviation $Xu$ between the actual contour $a$ and the programmed contour F of the workpiece W is greater, during the processing under the control of the programmed section S1 and at the termination of said section S1, than the magnitude of the change of contour in the X direction under the control of the programmed section S2. The programmed section S2 may be eliminated or skipped over in this case and the control may proceed directly from the programmed section S1 to the programmed section S3. At the commencement of the control under the program processing section S3, the deviation $Xu$ will, of course, have to be reduced or decreased in magnitude by a programmed change $Xe$, occurring in the programmed processing section S2, as shown in FIG. 1a.

In one of the following processing cycles, the cut may be made on a dot-dash line $b$. In this case, the deviation $Xu$ is less than the magnitude of the change of contour in the X direction under the control of the programmed section S2. The programmed processing section S2 may not then be bypassed or skipped over. Instead, the control magnitude provided by the programmed section S2 to the control system must be reduced or decreased by the magnitude of the deviation $Xu$.

Figure 1B:
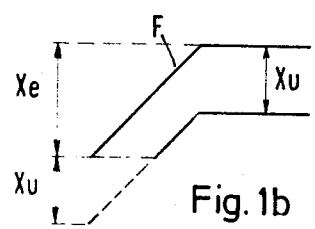
Figure 1C:
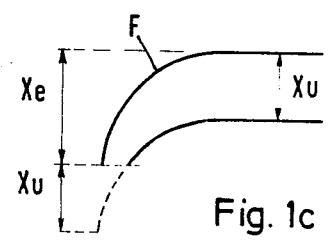

The deviation $Xu$ must be considered in the aforedescribed manner under different circumstances such as, for example, when the next-succeeding programmed processing section involves an inclined straight line, as shown in FIG. 1b, or a circular arc, as shown in FIG. 1c.

Figure 2:
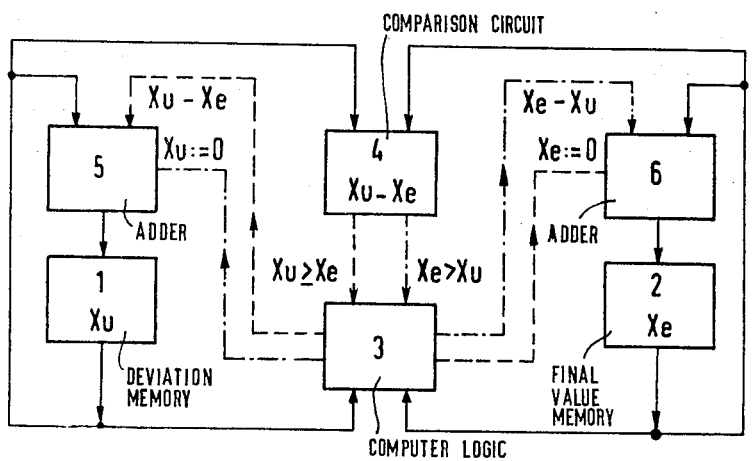
FIG. 2 is a block diagram of a circuit arrangement of the method and apparatus of the invention for comparing the programmed change and the derived deviation.

FIG. 2 illustrates a computer circuit for calculating the necessary computations. A deviation memory 1 functions as a series memory or storage and stores the deviation $Xu$ of the actual contour of the workpiece from the finished programmed contour. A final value or programmed contour change memory 2 stores the programmed change $Xe$ of the contour in the next-succeeding programmed processing section. The programmed change $Xe$ of the contour in the next-succeeding processing section corresponds to a change or addition in the X direction coordinate.

The output of the deviation memory 1 is connected in common to an input of a computer logic circuit 3, an input of an adder 5 and an input of a comparison circuit 4. The output of the adder 5 is connected to the input of the deviation memory 1. The output of the final memory 2 is connected in common to another input of the computer logic circuit 3, an input of an adder 6 and the other input of the comparison circuit 4. The output of the adder 6 is connected to the input of the final value memory 2.

In FIG. 2, an output of the comparison circuit is illustrated as being electrically connected to an input of the computer logic circuit 3 via a broken line and another output of said comparison circuit is illustrated as being electrically connected to another input of said computer logic circuit via a dot-dash line. An output of the computer logic circuit 3 is shown as being electrically connected to another input of the adder 5 via a broken line. Another output of the computer logic circuit 3 is shown as being electrically connected to another input of the adder 6 via a broken line. Another output of the computer logic circuit 3 is shown as being electrically connected to a third input of the adder 5 via a dot-dash line. Still another output of the computer logic circuit 3 is shown as being electrically connected to a third input of the adder 6 via a dot-dash line.

In FIG. 2, each of the broken line connections represents an electrical conductor which transmits a signal indicating that the deviation $Xu$ is greater in magnitude than the programmed contour change $Xe$, and each of the dot-dash lines represents an electrical conductor which transmits a signal when said programmed contour change is greater in magnitude than said deviation.

Figure 3:
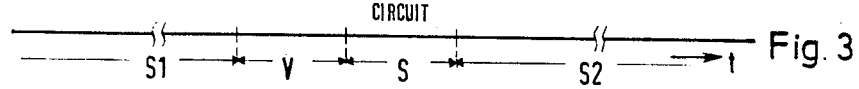
FIG. 3 is a graphical presentation of programmed processing sections and intermediate computations.

When, for example, the interpolation of the programmed processing section S1, as shown in FIG. 3, is completed, a comparison is subsequently made between the deviation $Xu$ at the termination of said first section and the programmed contour change or coordinate change $Xe$ in the next-succeeding programmed processing section. The computer logic circuit 3 produces corresponding commands in dependence upon whether the deviation $Xu$ is greater or smaller in magnitude than the programmed contour change $Xe$.

The broken lines of FIGS. 1a and 2 correspond to each other in indicating the situation in which the deviation $Xu$ is greater in magnitude than the programmed contour change $Xe$. The dot-dash lines of FIGS. 1a and 2 correspond to each other in indicating the situation in which the programmed contour change $Xe$ is greater in magnitude than the deviation $Xu$.

As shown in FIG. 2, in the situation represented by the broken lines, wherein the deviation $Xu$ is greater in magnitude than the programmed contour change $Xe$, said programmed contour change, as stored in the final value memory 2 is subtracted from the deviation $Xu$ as stored in the deviation memory 1. Simultaneously, the programmed contour change $Xe$ stored in the final value memory is set at zero. When the programmed contour change $Xe$ is greater than the deviation $Xu$, essentially the same operations are followed, with the smaller magnitude $Xu$ being subtracted from the larger magnitude $Xe$ and being set at zero in the deviation memory 1.

In FIG. 3, the comparison is represented by V and the subtraction is represented by S. Upon the completion of the comparison V and the subtraction S, normal computation such as, for example, normal interpolation, may be continued. The interruption in the processing operation, which is required for the comparison and the subtraction, is so brief that it does not interfere with said processing operation.

Figure 4:
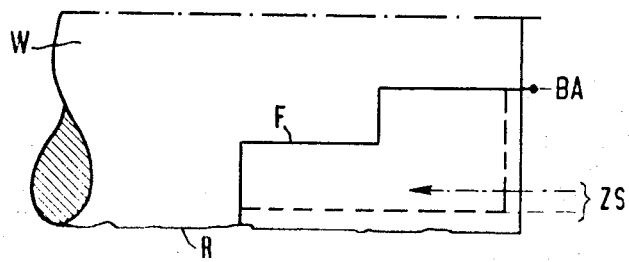
FIG. 4 is a schematic diagram illustrating processing cycles in a workpiece.

The principle of bypassing, elimination or skipping over of superfluous programmed processing sections may be utilized in a different manner. During the processing operation disclosed in the aforedescribed copending U.S. Pat. application, Ser. No. 866,507, the initial processing point BA, as shown in FIG. 4, is reinitiated after each cut. The initial processing point BA coincides with the commencement of processing under the control of the first programmed processing section for the finished contour F.

During the processing of a workpiece W having a rough contour R, such operation is not beneficial, since unnecessary distances are moved in the planar direction X during the individual cuts. It is therefore preferable to commence operations at the initial processing point BA only for the first cut, as indicated by broken lines in FIG. 4.

The position of the first cut may be registered by a counter. This permits the determination of the point of commencement for the second cut, indicated by the dot-dash line in FIG. 4, by computation. The maximum feasible work feed ZS for the individual cuts may be predetermined by the programmer or may be adjusted by decade switches at a control panel (not shown in the FIGS.). Since, in this type of operation, movement over additional distances in the planar direction X is eliminated, there is a saving in processing time.

It is within the scope of the invention to investigate either the programmed processing section succeeding a plurality of programmed processing sections, or a plurality of programmed processing sections simultaneously.

Figure 5:
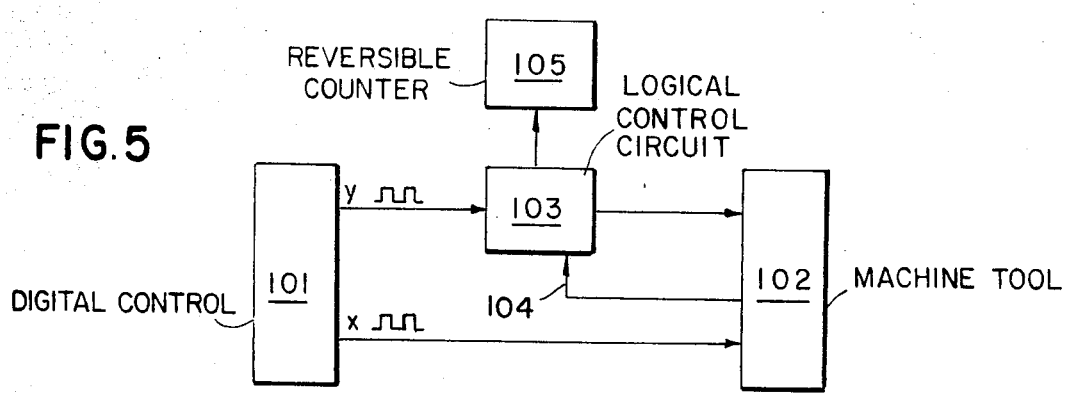
FIG. 5 is a schematic block diagram of the circuit arrangement of copending patent application Ser. No. 866,507 for providing variable workpiece contours in accordance with the method illustrated in FIGS. 7a and 7b.

In FIG. 5, a digital control 101 produces control pulses $x$ and $y$ and supplies such control pulses to the $x$ and $y$ drives of machine tool 102. The $x$ control pulses are supplied to the $x$ drive or stepping motor, for example, and the y control pulses are supplied to the $y$ drive or stepping motor, for example, A logical control circuit 103 is connected into the $y$ control circuit which transfers the $y$ control pulses from the digital control 101 to the machine tool 102. An input of the logical control circuit 103 is connected to the digital control 101, an output of said logical control is connected to machine tool drives and an output of said logical control circuit is connected to the input of a reversible counter 105. The logical control circuit 103 has a second input connected to the machine tool 102 via a lead 104.

Figure 7A:
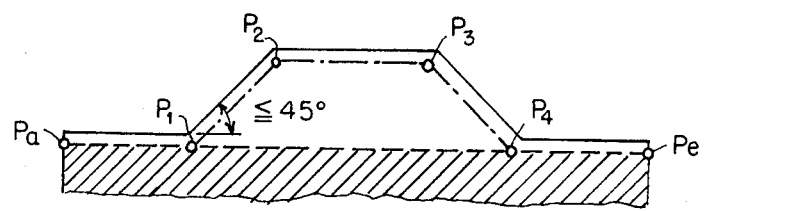
Figure 7B:
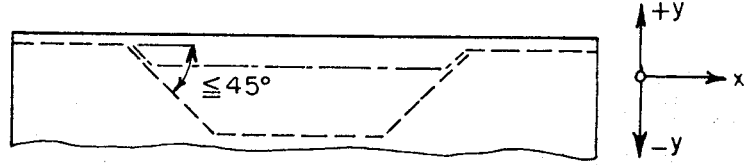

The logical control circuit 103 provides an increase or decrease in the cutting depth of the machine tool 102 in accordance with the torque applied thereto. The operation of the circuit arrangement or apparatus of FIG. 5 is described with reference to FIG. 7a. The contour $P_a$, $P_1$, $P_4$ and $P_e$ is programmed as a unit. This may be in a perforated strip, for example. Only $x$ control pulses are provided. No $y$ pulses are provided. The torque M applied to the cutting tool while it moves along the path $P_a$ to $P_1$ is less than the upper threshold level $M_{max}$ of the torque. There is thus no reason for reducing the cutting depth, that is, to move the cutting tool in the direction $+y$ (FIG. 7b).

If the reverse were true, and the torque M were less than the lower threshold level $M_{max}-\Delta$ of the torque, no increase would be provided in the cutting depth, since the contour produced by the cutting tool would then coincide with the programmed contour. The contour is monitored by the zero position of the reversible counter 105.

When the tool reaches the point $P_1$, the torque M applied thereto exceeds the upper threshold level $M_{max}$. This signals the logical control circuit 103 to supply $+y$ control pulses to the machine tool to reduce the cutting depth. The $+y$ control pulses, which comprise a y deviation from the programmed contour, are simultaneously supplied to the reversible counter 105. If the forward feed speeds in the $x$ and $y$ directions are equal to each other, the cutting tool moves at an angle of 45° to the point $P_2$, as shown by the broken dot and dash line.

At the point $P_2$ the cutting tool begins to move freely and the upper threshold level $M_{max}$ is thereby fallen short of. As a result, the reduction in the cutting depth $+y$ is blocked or halted and the tool moves along the contour path $P_2$ to $P_3$. The tool again moves freely and the torque decreases to a magnitude which is less than the lower threshold level $M_{max}-\Delta$. This indicates that the cutting depth will increase. The increase in the cutting depth is permissible, however, since the programmed y contour deviates from the actual contour, as indicated by the count condition of the reversible counter 105.

The logical control circuit 103 (FIG. 5) then supplies $-y$ pulses to the machine tool 102 and to the reversible counter 105. The tool 102 (FIG. 5) then moves from the point $P_3$ to the point $P_4$ along the contour path $P_3$ to $P_4$. At the point $P_4$, the count condition of the reversible counter 105 is zero. This indicates that the cutting depth y must not be further increased. The logical control circuit 103 thus does not provide any more pulses. The machine tool then moves along the contour path $P_4$ to $P_e$ from the point $P_4$ to the point $P_e$. The cycle is then repeated, from the point $P_a$ to the point $P_e$, as described, until the machine tool moves over the entire contour at rapid speed. When the machine tool moves over the entire contour path at rapid speed, the actual contour coincides with the programmed contour, and such contour is indicated by the linear broken line $P_a P_1 P_4 P_e$. The method described for providing the broken contour of FIG. 7a may be utilized to provide the depressions, channel, groove, and the like, of FIG. 7b. In FIG. 7b, the dot and dash line indicates the contour path of the machine tool in one cycle of operation. The desired contour is indicated by the broken line.

Figure 8A:
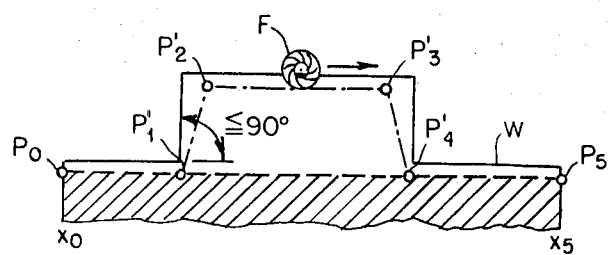

FIG. 6 illustrates apparatus or a circuit arrangement for performing the method illustrated in FIG. 8a. In FIG. 6, as in FIG. 5, a digital control 101' produces $+x$, $-x$, $+y$ and $-y$ control pulses and supplies said pulses to a machine tool 102'. A plurality of critical value indicators is provided. The critical value indicator 12 has a variable response sensitivity to the lower threshold level $M_{max}-\Delta$. The critical indicator 13 has a variable response sensitivity to the upper threshold level $M_{max}$. The critical indicator 14 has a variable response sensitivity to a threshold level $M_{max}+\Delta$ above the upper threshold level. The machine tool 102' is connected to the input of each of the critical value indicators 12, 13 and 14 via an amplifier and smoothing circuit or filter 17. The part of the machine tool 102' which is connected to the amplifier 17 is the torque transmitter thereof, which may comprise, for example, the torque transmitter.

The outputs of the critical value indicators 12, 13 and 14 are connected to an input of the digital control 101' via a switch 106. The torque transmitter of the machine tool 102' is connected to another input of the digital control 101' via an amplifier 18 and an additional critical value indicator 11, connected in series circuit arrangement therewith, which is a variable response sensitivity to a minimum threshold level $M_{min}$ of the torque. The output signals of the critical value indicators 12, 13 and 14 control the type or mode of operation or process, as well as the blocking or release of the power reversible counters 107 and 109 and a pair of pulse generators 108 and 110.

The reversible counter 107 is for the y direction, the reversible counter 109 is for the x direction. The pulse generator 108 is for the y direction and the pulse generator 110 is for the x direction. The control of the pulse generators 108 and 110 by the digital control 101' is effected via NOR stages or gates 15 and adders or adding components 16, which lock the additional control pulses into the corresponding pulse generators 108 and 110. The digital control 101' controls the reversible counters 107 and 109 via NOR gates 19. The additional critical value indicator 11 controls the changeover from rapid to working speed of the tool.

In FIG. 8a, the desired contour path is indicated as $P_0$, $P'_1$, $P'_4$ and $P'_5$. The feed or movement of the machine tool is from $x_0$ to $x_5$. The digital control 101' (FIG. 6) thus supplies to the machine tool 102' a number of x pulses corresponding to the distance $x_0$ to $x_5$.

If the milling or cutting tool F of FIG. 8a is not at the point $P_0$ at the commencement of the milling process or operation, said milling tool initially moves at rapid speed toward the workpiece W. The torque M applied to the cutting tool F remains less than the minimum torque or threshold level $M_{min}$. At the point $P_0$, the tool F engages the workpiece W. The torque applied by the torque transmitter to the machine tool 102' then exceeds the minimum threshold level $M_{min}$. This causes the additional critical value indicator 11 (FIG. 6) to initiate the work feed. When the torque increases so that it is greater than the lower threshold level $M_{max}-\Delta$ and less than the upper threshold level $M_{max}$, the working process proceeds rapidly. If the torque were to increase to a magnitude greater than the upper threshold level $M_{max}$, the work process would proceed slowly and the cutting depth would be reduced.

Figure 8B:
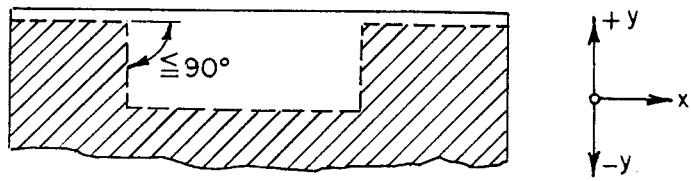

If the cutting tool F is positioned along the contour path $P_0$ to $P'_1$ and the torque applied to said tool is between the lower threshold level and the upper threshold level, said contour path is milled at rapid speed. When the milling tool F abuts the projection at the point $P'_1$, the upper threshold level $M_{max}$ of the torque is exceeded. The work process then continues slowly, rather than rapidly, and a command is simultaneously provided to reduce the cutting depth in the direction $+y$ (FIG. 8b). The pulse generator 108 of FIG. 6 is controlled by the critical value indicator 13 for this purpose. The pulse generator 108 supplies $+y$ control pulses to the machine tool 102' via the corresponding adder 16.

The $+y$ control pulses supplied by the pulse generator 108 to the machine tool 102' are also supplied to the reversible counter 107. Since this corresponds to a substantially vertical contour path, the threshold level $M_{max}+\Delta$ above the upper threshold level is exceeded a short time thereafter. This causes the critical value indicator 14 to respond and block the x forward feed. The critical value indicator 14 controls the pulse generator 110 to supply $+x$ pulses to the reversible counter 109 and to the machine tool 102' via the corresponding adder 16. The milling tool F then moves from the point $P'_1$ to the point $P'_2$ (FIG. 8a).

The torque applied to the tool F becomes less than the threshold level $M_{max}+\Delta$ when said tool is in the vicinity of the point $P'_2$. As a result, the x control pulses are supplied to the machine tool F. The torque decreases to less than the upper threshold level $M_{max}$ due to the reduction of the cutting depth. The reduction of the cutting depth is halted at the point $P'_2$ in the direction $+y$. The contour path $P'_1$ to $P'_2$ is then recorded or stored in the reversible counter 107. The contour path which the tool 102' or F would have moved in the $x$ direction, if the $x$ forward feed were not blocked, is stored or recorded in the counter 109.

The cutting tool F is moved from the point $P'_2$ to the point $P'_3$ along the contour path $P'_2$ to $P'_3$ in FIG. 8a. At the point $P'_3$, the cutting tool moves freely, so that the torque applied thereto becomes less than the minimum threshold level $M_{max}-\Delta$. A command signal is then supplied to the pulse generator 108 and said pulse generator, in response to said command signal, supplies six control pulses for increasing the cutting depth. The $y$ control pulses are simultaneously supplied to the reversible counter 107 and said counter then counts backward. When the machine tool reaches the point $P'_4$ at the end of the contour path $P'_3$ to $P'_4$, the count condition of the reversible counter 107 is zero. The pulse generator 108 is then halted in operation and the cutting tool 102' (FIG. 6) is moved in $x$ direction, along the contour path $P'_4$ to $P_5$, from the point $P'_4$ to the point $P_5$.

Only the $x$ direction control pulses supplied to the reversible counter 109 during the blocking condition are unaccounted for. To account for these pulses, the repetition of the operation or process cycle should be blocked or delayed until the count condition of the reversible counter 109 reaches zero. At the end of each cycle of operation a command is transferred to the pulse generator 110 (FIG. 6), in the aforedescribed manner, so that said pulse generator supplies control pulses simultaneously to the contour 109 of the machine tool 102', until said counter again reaches its zero count condition. The cycle, as described, is then repeated until the entire contour path $P_0$ $P'_1$ $P'_4$ $P_5$ is traversed by the tool at rapid speed. At such time, the desired contour path, indicated by the broken lines, is actually attained.

The aforedescribed operation may be utilized to provide the contour shown in FIG. 8b.

Each of the component blocks of each of FIGS. 5 and 6 represents a known circuit arrangement and any suitable circuit which functions in the manner indicated may be utilized as such block.

While the invention has been described by means of a specific example and in a specific embodiment, we do not wish to be limited thereto, for obvious modifications will occur to those skilled in the art without departing from the spirit and scope of the invention.

We claim:

1. In a method for adaptive programmed control of a turning machine tool for removal of material from a workpiece by programmed processing sections during processing cycles, including the steps of rapidly feeding the tool until it comes into contact with a workpiece, work feeding the tool up to a maximum to the programmed contour until a magnitude depending upon the forming power and the material removing rate exceeds a lower threshold level, reducing the work feeding and movement of the tool in the direction of reduced feed-in for a period of time until the magnitude depending upon the forming power falls below an upper threshold level, and work feeding the tool repeatedly until the actual contour of the workpiece coincides with a programmed contour, the improvement comprising the steps of deriving the deviation $Xu$ of the actual contour of the workpiece from the finished programmed contour during each of the processing cycles at the end of each programmed processing section;

comparing the programmed contour of the workpiece in the next-succeeding programmed processing section with the derived deviation $Xu$ to provide a comparison result during each of the processing cycles at the end of each programmed processing section; and eliminating or utilizing the next-succeeding programmed processing section in accordance with the comparison result.

2. A method as claimed in claim 1, wherein the programmed processing section includes a programmed change $Xe$ in the contour of the workpiece and wherein the next-succeeding programmed processing section is eliminated when the derived deviation $Xu$ exceeds the programmed change $Xe$ of the contour in the next-succeeding programmed processing section and when the derived deviation $Xu$ is less than the programmed change $Xe$ of the contour in the next-succeeding processing section only the difference between the programmed change $Xe$ in the processing section and the derived deviation $Xu$ is utilized to control the machine tool, and further comprising the step of altering the derived deviation $Xu$ for the processing section following the next-succeeding processing section when the derived deviation $Xu$ exceeds the programmed change $Xe$ of the contour in the next-succeeding programmed processing section.

3. A method as claimed in claim 1, wherein all the programmed processing sections are fed in only during the first processing cycle and the section which starts the next cycle after the first is determined by the deviation of the programmed contour.

4. In apparatus for adaptive programmed control of a turning machine tool for removal of material from a workpiece by programmed processing sections during processing cycles, including feeding means for rapidly feeding the tool until it comes into contact with a workpiece, and work feeding means for work feeding the tool up to a maximum to the programmed contour until a magnitude depending upon the forming power and the material removing rate exceeds a lower threshold level and for reducing the work feeding and movement of the tool in the direction of reduced feed-in for a period of time until the magnitude depending upon the forming power falls below an upper threshold level, said work feeding means operating repeatedly until the actual contour of the workpiece coincides with a programmed contour, the improvement comprising deriving means for deriving the deviation $Xu$ of the actual contour of the workpiece from the finished programmed contour during each of the processing cycles at the end of each programmed processing section;

deviation memory means coupled to said deriving means for storing the derived deviation $Xu$;

final value memory means for storing the programmed change $Xe$ of the contour in the next-succeeding programmed processing section;

comparing means connected to said deviation memory means and said final value memory means for comparing the programmed contour change X$e$ of the workpiece in the next-succeeding programmed processing section with the derived deviation X$u$ stored in said memory means to provide a comparison result during each of the processing cycles at the end of each programmed processing section; and circuit means coupled between said comparing means and said memory means for eliminating or utilizing the next-succeeding programmed processing section in accordance with the comparison result.

* * * * *

F-5109

UNITED STATES PATENT OFFICE
CERTIFICATE OF CORRECTION

Patent No. 3,684,873          Dated August 15, 1972

Inventor(s) JURGEN MEYER and GERHARD SAUTTER

It is certified that error appears in the above-identified patent and that said Letters Patent are hereby corrected as shown below:

In the heading to the printed specification, line 10, "P18 03 742.8" should read -- P 19 49 498.5 --.

Also, the name and address of the assignee was omitted, which is:

--SIEMENS AKTIENGESELLSCHAFT, Munchen, Germany--

Signed and sealed this 13th day of November 1973.

(SEAL)
Attest:

EDWARD M. FLETCHER, JR.
Attesting Officer

RENE D. TEGTMEYER
Acting Commissioner of Patents